United States Patent
Dolgas

[19]

[11] Patent Number: 5,915,643
[45] Date of Patent: *Jun. 29, 1999

[54] STATOR WINDING METHOD

[75] Inventor: Patrick A. Dolgas, Milford, Ohio

[73] Assignee: Globe Products Inc., Huber Heights, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,857

[22] Filed: Dec. 19, 1996

Related U.S. Application Data

[60] Provisional application No. 60/008,945, Dec. 20, 1995.

[51] Int. Cl.$^6$ ...................................................... H02K 3/00
[52] U.S. Cl. ........................ 242/433; 242/433.4; 310/179
[58] Field of Search ................................. 242/433, 433.1, 242/433.2, 433.3, 433.4; 29/605, 596; 310/179

[56] References Cited

U.S. PATENT DOCUMENTS

| | | | |
|---|---|---|---|
| 3,713,208 | 1/1973 | Doyle | 29/597 |
| 4,307,311 | 12/1981 | Grozinger | 310/179 |
| 4,765,551 | 8/1988 | Page et al. | |
| 5,018,676 | 5/1991 | Gulbrandson | 242/433 |
| 5,172,870 | 12/1992 | Van Assema | 242/433 |
| 5,328,108 | 7/1994 | Murai | 242/433 |
| 5,394,406 | 2/1995 | Dolgas | 310/254 |
| 5,407,142 | 4/1995 | Trevisan | 242/433 |
| 5,723,931 | 3/1998 | Andrey | 242/433 |

OTHER PUBLICATIONS

Commonly–owned utility application serial no. 08/769,858 filed Dec. 19, 1996.

*Primary Examiner*—Katherine Matecki
*Attorney, Agent, or Firm*—Roger S. Dybvig

[57] ABSTRACT

A multiple phase, multiple pole stator is wound using two coil winding passes per phase. The stator core is indexed in alternate directions between the winding of individual coils of one phase to the next. As a result, the coils of a particular phase are wound using a first stator index direction for the first winding pass and a second stator index direction for the second winding pass. A winding apparatus for such winding has an arbor assembly which includes a tubular shaft having an expandable mandrel at the forward end thereof which is received in the bore of a stator. The mandrel includes a fixed, radially-extending key and at least one pivotal, radially-extending key. The keys are received in slots or keyways provided in the stator bore to lock the stator to the shaft and to rotatably drive the stator during the winding process. An improved combined winding form and lead guide mechanism assembly is also illustrated wherein a lead guide sliding assembly is located in a cavity in the winding form.

18 Claims, 9 Drawing Sheets

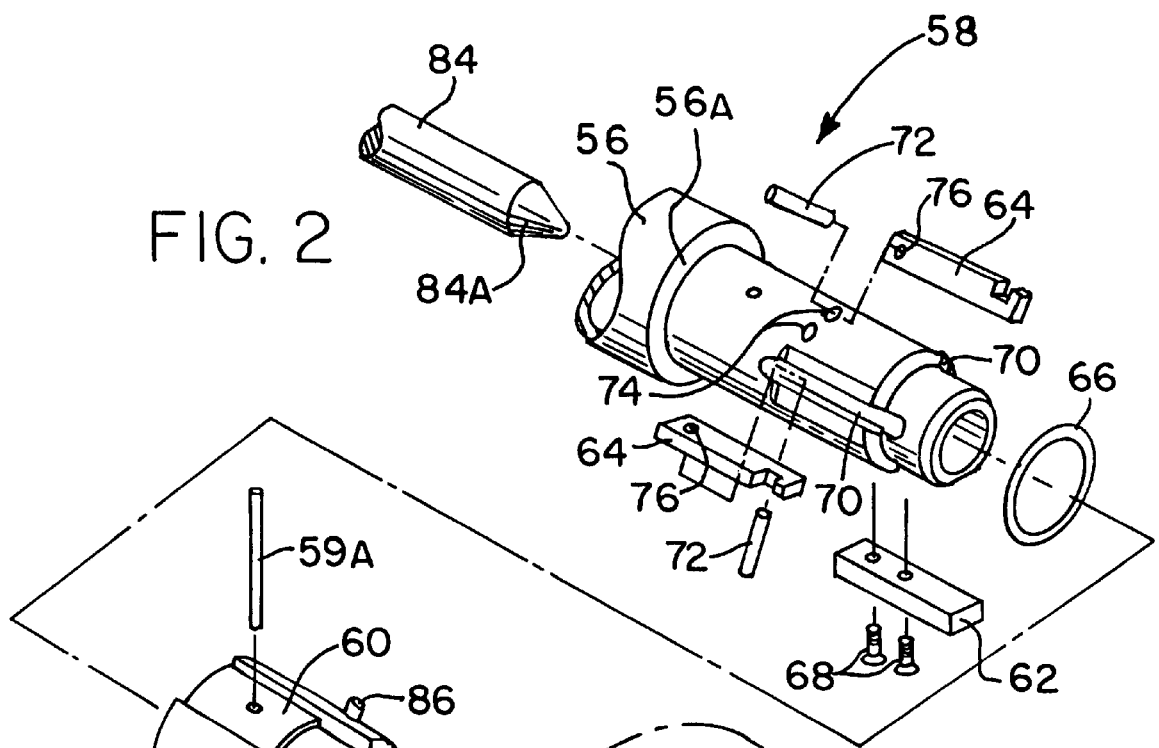
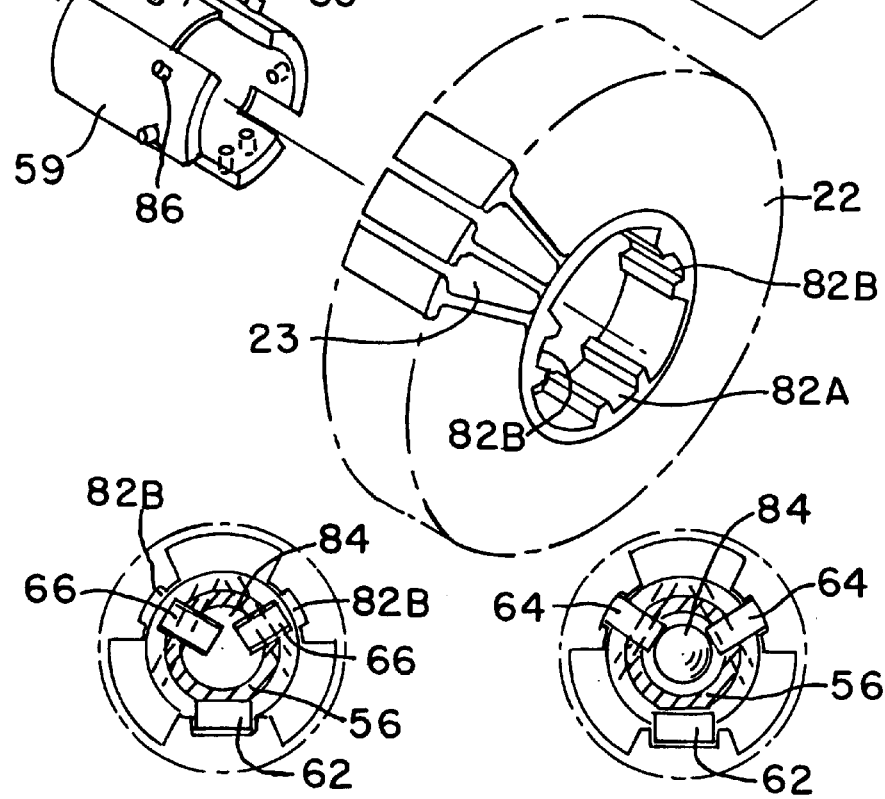
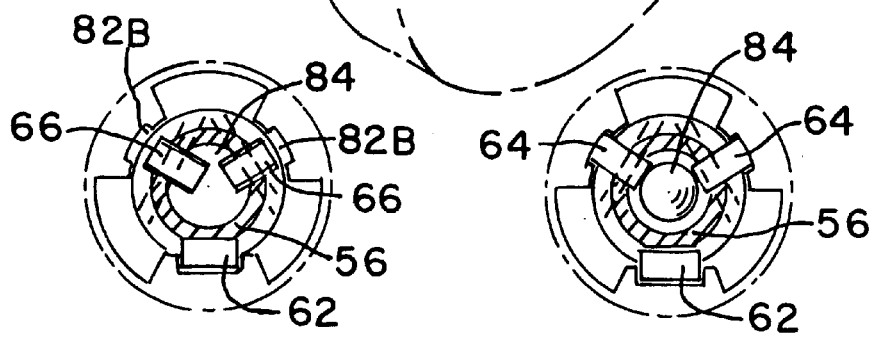
FIG. 2
FIG. 3
FIG. 4

STATOR WINDING METHOD

CROSS-REFERENCE TO RELATED APPLICATIONS

This application claims the benefit of U.S. Provisional application Ser. No. 60/008,945 filed Dec. 20, 1995. This application is also related to application Ser. No. 08/769,858, filed Dec. 19, 1996, which also claims the benefit of the above U.S. Provisional application.

FIELD OF THE INVENTION

This invention relates to a method for winding electric motor stators and, in particular, to a method for winding stators for multiple phase, multiple pole electric motors, which stators have plural radially-extending and outwardly opening coil-receiving core slots separated by teeth so shaped that the radially-outermost ends of the coil-receiving slots are open. However, aspects of this invention may also be useful for winding other wound electric motor components.

INCORPORATION BY REFERENCE

The disclosures of U.S. Pat. No. 4,765,551 to Page et al., U.S. Pat. No. 4,915,313 to Banner et al., and U.S. Pat. No. 5,187,856 to Corey et al. are hereby incorporated herein by reference.

BACKGROUND OF THE INVENTION

It is known that improvements in the electrical characteristics of multiple-phase stators can be obtained by dividing each coil of each phase into two or more coil portions which are separated by coil portions of the other phases. Such a winding pattern may be referred to as a split-coil pattern. For example, in winding a three phase, eight pole stator, portions of the eight coils forming the first phase are wound, followed by portions of the eight coils forming the second phase, followed in turn by the winding of portions of the eight coils of the third phase. A second portion of the eight coils of the first phase is then wound into respectively the same core slots as the portions of the same first phase coils portions wound at the outset, and so forth, until all of the coils are wound. If each coil is wound in two portions, a total of 48 coil portions are wound.

Flier-type winding machines have mechanisms for holding the core of a part to be wound and indexing the core as required to place the appropriate coil-receiving slots into a position to have coils wound therein by rotation of the flier. Typical stator coil winding patterns practically preclude the use of but one coil-winding flier. Accordingly, when winding a stator having 48 separately wound coil portions, the stator core will have to be indexed into the various positions required to completely wind the stator a total of 48 times, once for each coil portion to be wound.

In addition to winding coils, it is desirable during the winding process to mechanically connect the start and finish lead wire ends of each phase to terminals mounted on the stator core. The time taken to make the terminal connections appreciably adds to the total time required to fully wind the stator core and effect terminal connections.

Normal practice when winding multiple phase stators by a flier-type winding machine is to wind a first coil of the first phase, index the stator core in a predetermined direction about its axis to position the stator core relative to the flier to enable the winding of the second coil of the first phase, and repeating this process until all of the coils of the first phase are wound, each time indexing the stator core in the same predetermined direction. After another index, the coils of the second phase are wound, with the stator core indexed in the same forward direction after each coil but the last is wound. The direction of index of the stator core for the winding of the third phase is the same as for the winding of the coils of the second phase.

After the winding of all three phases is completed, the lead wires, i.e. both the start and finish wires, extending to and from each phase are typically connected by hand to terminals, which may be mounted on the stator core by means of a "terminal board." Six terminal connections are required, two for each phase. If the stator is wound with a split-coil winding, 12 terminal connections are required, two for each one-half phase wound.

Stators having outwardly-opening coil-receiving slots have been wound using a flier-type winding apparatus of a type more typically used for winding armatures. Typical flier-type winding machines employ a collet mechanism to grip the shaft of an unwound armature during the winding operations. For winding stators which do not have a shaft, a practice has been to affix a dummy shaft aligned with the bore of the stator and grip the dummy part by a collet associated with the stator winding machine. Such collet mechanisms are generally operated by use of a rod that extends within a rotator shaft, which rod is either extended or retracted to actuate the collet mechanism. Examples of such collet mechanisms, as used in armature winding machines, are illustrated in the aforementioned '313 and '856 patents and in U.S. Pat. Nos. 4,826,092 and 5,127,594.

In many instances of winding coils for a dynamoelectric device, such as a stator or armature, a single winding form configuration is sufficient for the winding of all of the coils. In such instances, the use of a conventional winding form assembly that has an integral lead guide mechanism having its lead guide-carrying components carried externally on one of the side plates is acceptable. However, in other instances, particularly in those cases in which the coil span subtends a shallow angle, such as in 4, 6 or 8 pole armatures or stators, it is desirable to use different winding forms having different wire-guiding characteristics for different sets of the coils to be wound. These different wire-guiding characteristic may be obtained, for example, by changing the side plates that form the winding form assembly. Removal and replacement of such side plates can be a complex task, and the costs of side plates quite high if, as often the case, the winding form is provided with movable lead guides that assist in guiding the lead wires extending to and from the wound coils around tangs or hooks on a commutator of an armature being wound or on a terminal board affixed to a stator core being wound.

SUMMARY OF THE INVENTION

An object of this invention is to provide an improved method for winding multiple phase stators having radially-outwardly opening core slots by the use of a flier-type winding machine.

A related object of this invention is to provide an improved method for winding multiple phase stators having radially-outwardly opening core slots and connecting coil lead wires to the terminals carried by the stators during the winding process.

Another related object of this invention is to provide a stator winding method for winding a multiple phase stator wherein the total number of required terminal connections is less than the number of terminal connections required by known winding methods.

In accordance with this invention, the foregoing objects are met by providing a winding process comprising winding a first set of coils that form a first phase winding by winding the set beginning with the lead wire that attaches to a first positive terminal and ends with the lead wire that attaches to a common terminal or ground, winding a second set of coils that forms a second phase winding beginning with a lead wire which attaches to the same common terminal or ground and ending with a lead wire that attaches to a second positive terminal. The winding then progresses to the winding of a third phase winding beginning with a lead wire that attaches to a third positive terminal and ends with a lead wire that attaches to a common terminal or ground. The latter common terminal or ground may be the same as the first common or ground terminal but is preferably a separate terminal. Following this winding method, the wire portion intermediate the first phase winding and the second phase winding is advantageously connected to the same common or ground terminal.

Further in accordance with this aspect of the invention, the terminal connections are made as the winding operation progresses, and starts with the connection of the first lead wire of the first phase to the first positive terminal. When the first phase winding is completed, the lead wire extending from the last coil wound is connected to a common or ground terminal and the winding of the second phase winding proceeds without the need for a second terminal connection at this point. After the second winding is completed and its finish lead wire connected to the second positive terminal, the wire is severed. Thereafter, the formation of the third phase winding begins with the connection of its lead wire to the third positive terminal and proceeds with the winding of the coils and, as was the case with the first phase winding, the lead wire extending from the last coil wound is connected to a common or ground terminal.

If the three phase windings described in the immediately preceding paragraph are the start of a split-coil winding, after the connection of the lead wire extending from the third phase to the common or ground terminal is accomplished, the winding proceeds with the winding of the second set of the first phase winding, beginning from the latter common or ground terminal and finishing with the connection of the lead wire extending from the last coil wound to the first positive terminal. The wire leading from the flier is then severed, its free end connected to the second positive terminal, and the winding of the second set of coils of the second phase are wound and the lead wire extending from the last coil wound connected to a common or ground terminal. The winding then progresses to the winding of the second set of coils of the third phase starting from the latter common or ground terminal and ending with the last coil or coil portion to be wound. The lead wire from the last coil is connected to the third positive terminal.

Following the foregoing procedures, the number of ground connections which must be made for an ordinary three phase winding is one-third less than ordinarily required. If the winding is a three-phase, split-coil winding the number of ground connections is less by one-half than the number of ground connections required in the past.

In order to accomplish starting winding from the positive terminal for a first set of coils wound from a strand of wire and starting from a common or ground terminal to wind a second set of coils from the same strand of wire, the stator core is indexed in one direction between the winding of each of the coils of the first set and in the opposite direction between the winding of each of the coils of the second set of coils. The reversal of the direction the stator is indexed between coils applies to the winding of each subsequent set of coils.

Other objects and advantages of this invention will become apparent in view of the following description taken in conjunction with the accompanying drawings.

BRIEF DESCRIPTION OF THE DRAWINGS

FIG. 2 is a fragmentary, exploded perspective view of a portion of the apparatus of FIG. 1, but shown on a larger scale than FIG. 1.

FIG. 3 is a front elevational view of a portion of the apparatus of FIG. 1 with a stator core to be wound mounted thereon.

FIG. 4 is a front elevational view similar to FIG. 3, but at a later stage in the manufacturing process.

DETAILED DESCRIPTION

Figure 1:
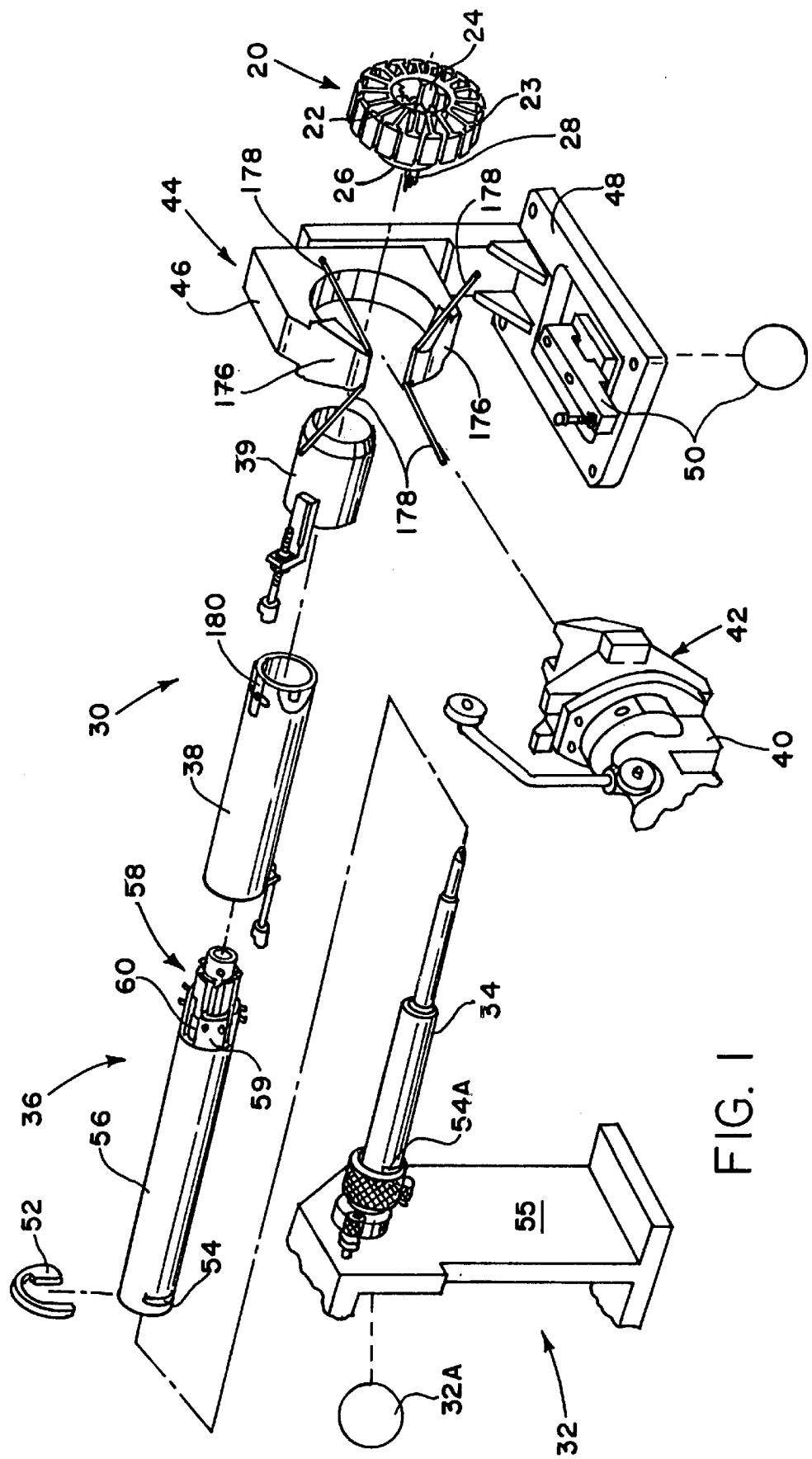
FIG. 1 is a fragmentary, exploded, partly-schematic perspective view of a stator manufacturing apparatus useful in the practice of this invention.

With reference to FIGS. 10 through 13, this invention provides a method for winding coils of wire 200 forming an electric motor stator, generally designated 20, including a stator core 22 having a plurality of radially-opening core slots 23 and a bore 24 (FIG. 1), a terminal board 26, and a plurality of terminals 28 projecting from the terminal board 26.

Figure 10:
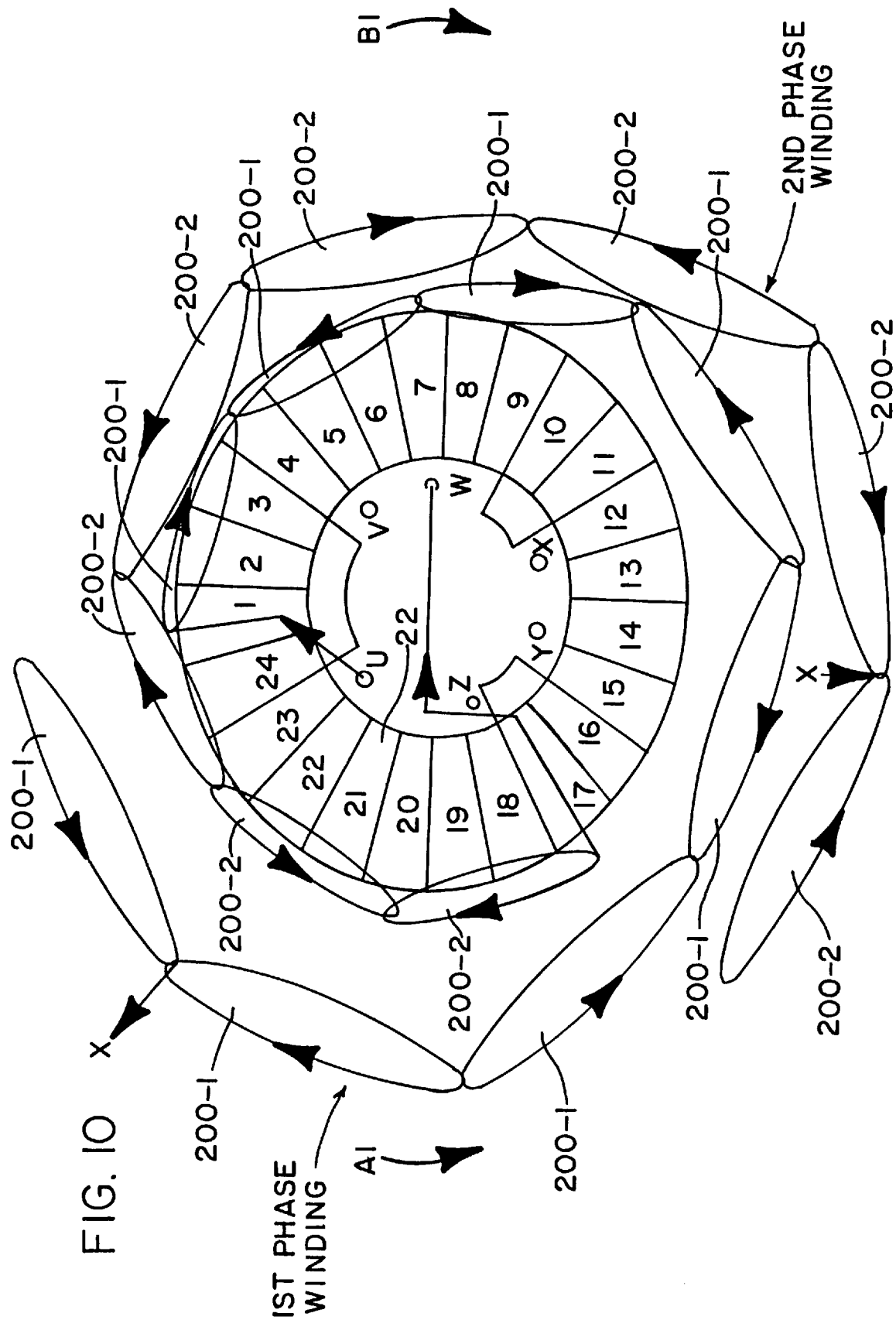
FIGS. 10 through 12 are enlarged, schematic views of the stator core illustrating a method of winding a three-phase stator in accordance with this invention.
Figure 11:
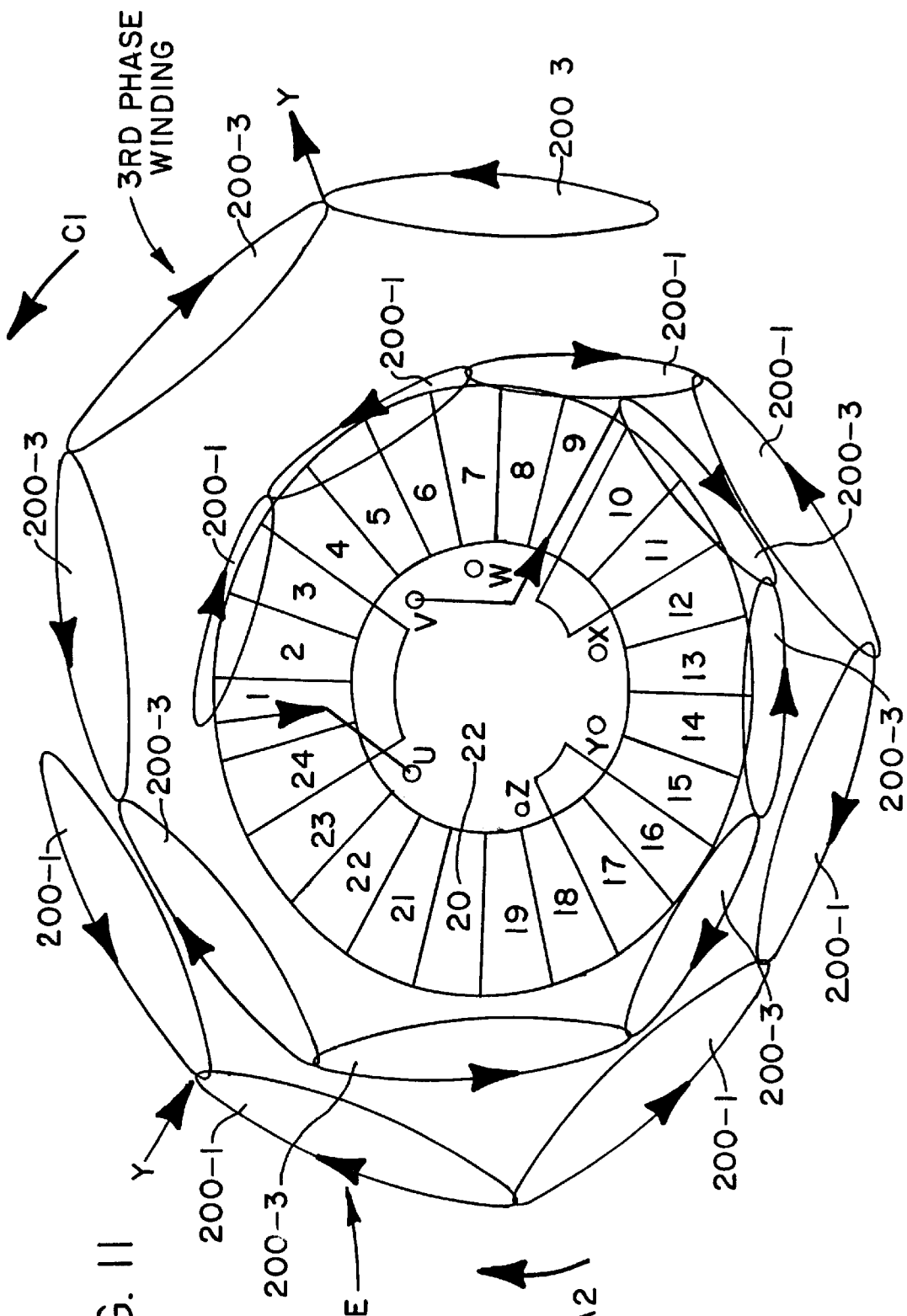
Figure 12:
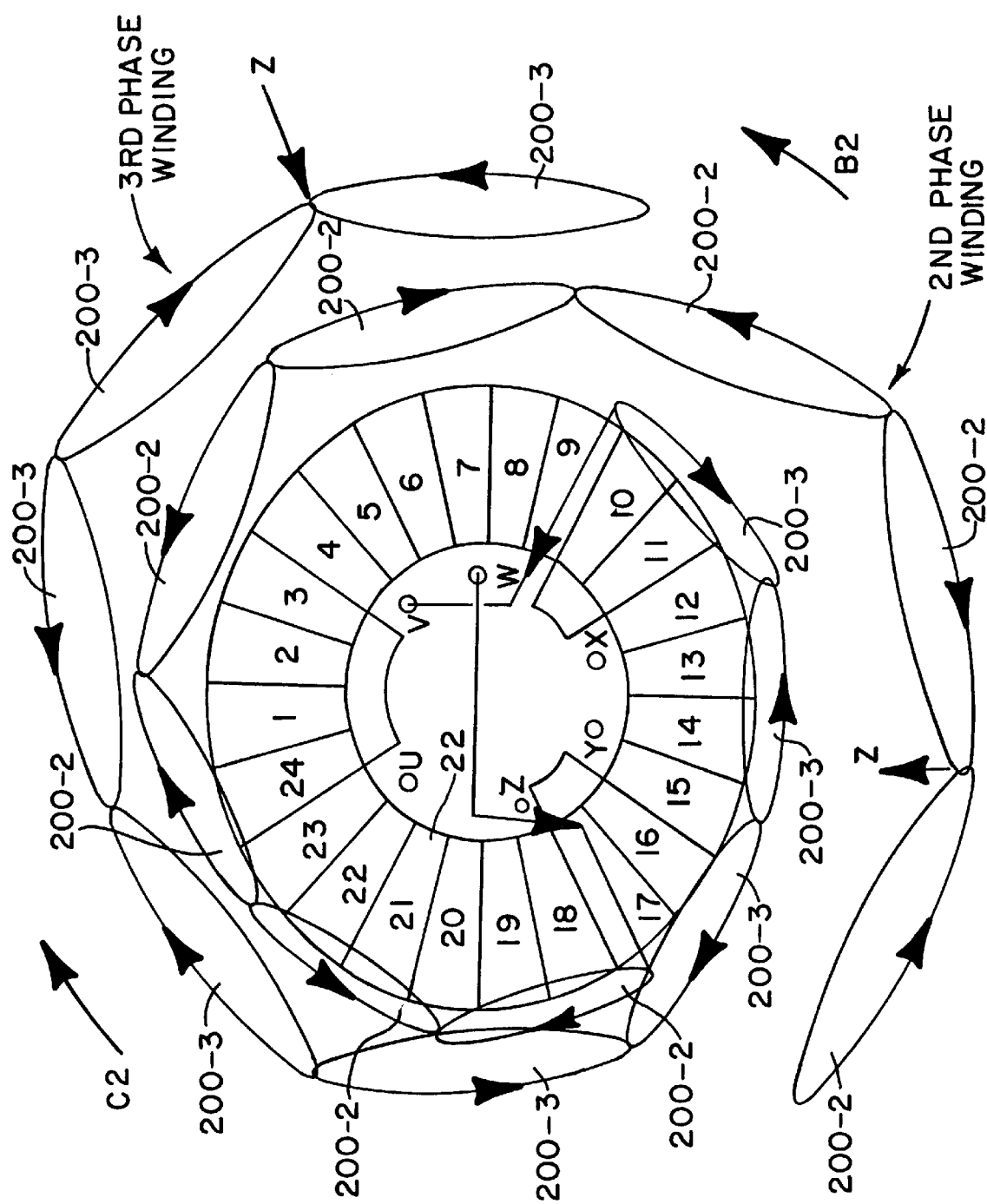

FIGS. 10 through 12 schematically illustrate a coil winding sequence in accordance with this invention for a three-phase, eight pole electric motor stator. For purposes of describing the method, the six terminals illustrated in FIGS. 10 through 13 are designated U, V, W, X, Y and Z. The terminals U, V and W are positive terminals, the terminals X, Y and Z being common or ground terminals.

Figure 13:
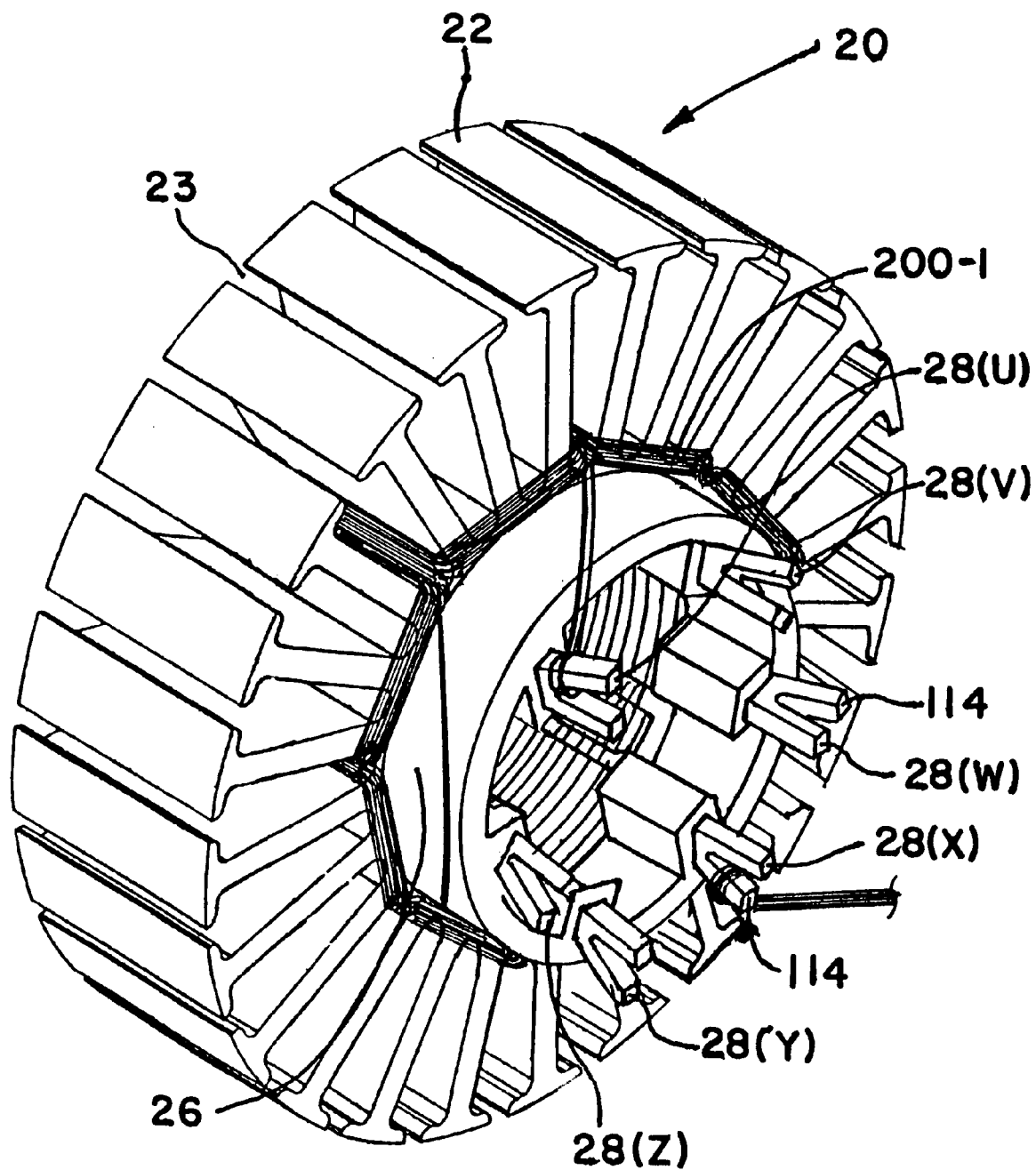
FIG. 13 is an enlarged, perspective view of a stator partially wound in accordance with this invention showing a strand of wire connected to a positive terminal, eight partial coils of the first phase winding wound into slots in the stator core, and further showing the strand of wire lopped around a common or ground terminal.

Prior to winding the coils 200-1 of a first phase winding, a lead wire, designated a start wire, is connected to the positive terminal U, such as by looping the wire around a terminal tang 114, as illustrated in FIG. 13. Thereafter, the stator core 22 is indexed to align a first pair of selected core slots 23 with a winding form. A portion of each of the coils 200-1 of a first phase winding are then wound in a conventional manner into selected pairs of core slots 23 from a source of wire under tension (not shown). In other words, a predetermined number—preferably half—of the turns of wire that form each of the coils 200-1 of the first phase winding are wound in this first winding pass. During this first winding pass for the first phase winding, the core 22 is indexed after the winding of each partial coil 200-1 in the direction of the arrow A1 in FIG. 10 to align the next pair of core slots 23 with the winding form. In addition, the direction of flier rotation for successive coils 200-1 alternates from coil to coil.

After the partial coils 200-1 of the first phase winding are wound, the wire is then connected to the terminal X, as illustrated in FIG. 13. The portions of the coils 200-1 thus far wound are each wound equally close to the center of the stator core 22, as shown in FIG. 13. It will be understood that each of the portions of the coils 200 wound during a particular winding pass are wound atop, i.e. radially-outwardly of, the next previously wound set of coils and are all wound the same distance from the center of the core 22.

Following the connection of the wire to the terminal X, the core 22 is again indexed, with the tension on the wire released, to align the appropriate first pair of core slots 23 for the first partial coil 200-2 of the second phase winding with the winding forms. As with the portions of the coils 200-1 of the first phase winding, portions of coils 200-2 of a second phase winding are wound during a first winding pass for the second phase winding, the coil portions each formed by a predetermined number—preferably half—of the total wire turns needed to form each coil 200-2 of the second phase winding. Likewise, the direction of flier rotation also alternates for each successive partial coil 200-2. However, the partial coils of the second phase winding are successively wound by indexing the core 22 in the direction of the arrow B1 in FIG. 10, which is opposite the direction of the arrow A1. Thus, it will be recognized that the direction in which the stator core 22 is indexed between the coil portions alternates from one phase winding to the next. In addition, it will be recognized that the first wound portions of the coils 200 of both the first and second phase windings are wound from a single strand of wire.

After the portions of the coils 200-2 of the second phase winding are wound, the wire is connected in a conventional manner to the positive terminal W. Thereafter, the wire is severed from the source in any conventional manner. For example, the apparatus 30 may also include a wire gripper (not shown) and a wire cutting blade 180, such as shown in U.S. Pat. No. 4,827,601 to Banner. Alternatively, the wire may be severed as described in the aforementioned Corey et al. U.S. Pat. No. 5,187,856, or U.S. Pat. No. 5,379,511 to Corey et al. As yet another alternative, the wire may be severed by snapping the wire against a tang 114, as is well known in the art.

With reference to FIG. 11, the wire gripped by the wire gripper, which is again designated a start wire, is connected to the positive terminal V. Thereafter, portions of each of the coils 200-3 of the third phase winding are wound in a manner substantially identical to the portions of the coils 200 of the first and second phase windings by successively indexing the stator core 22 in the direction indicated by the arrow C1 in FIG. 11. Thus, the direction of flier rotation for the portions of coils 200-3 alternates from one coil to the next, and the direction in which the stator core 22 is indexed between partial coils 200-3 is reversed from the next previously wound phase winding. Following the winding of the partial coils 200-3 of the third phase winding, the wire is connected to the common or ground terminal Y.

With further reference to FIG. 11, the stator core 22 is then indexed, with the tension on the wire released, so that the pair of core slots 23 in which the last-wound partial coil 200-1 of the first phase winding were wound are again aligned with the winding form. Tension is reapplied to the wire, and the remaining portions, i.e. the remaining wire turns needed to form each of the coils 200-1, of the first phase winding are then wound into the same core slots as the corresponding, previously-wound partial coils 200-1 of the first phase winding, this second winding pass for the first phase winding beginning with the remaining portion of the coil 200-1 wound during the first winding pass for the first phase winding. Accordingly, the remaining portions of the coils 200-1 are wound by indexing the stator in the direction shown by the arrow A2 in FIG. 11, which is opposite the direction of the arrow A1 of FIG. 10. Thus, it will be apparent that the stator core 22 is indexed in one direction between the winding of the first-wound portion of each of the coil 200-1, but the core 22 is indexed in an opposite or reverse direction between the winding of the last-wound portions of each of the coils 200-1. Here, one skilled in the art will note that the direction of flier rotation must be the same for both the first-wound and last-wound portions of a given coil.

After each of the coils 200-1 of the first phase winding is completely wound, the wire is connected to the positive terminal U and severed from the source of wire in the same manner as described above. Thus, the first wound portions of the coils 200-3 of the third phase winding and the last wound portions of the coils 200-1 of the first phase winding are formed from a single strand of wire.

With reference to FIG. 12, following steps similar to those described above, the new start wire is then connected to the positive terminal W, the remaining turns of each of the coils 200-2 of the second phase winding are wound by indexing the stator in the direction reverse from the stator index direction for the first-wound portions of the coils 200-2, as indicated by the arrow B2 in FIG. 12, beginning with the remaining portion of the coil 200-2 needed to complete the last wound coil 200-2 wound during the first winding pass for the second phase winding. The wire is then connected to the common or ground terminal Z, the remaining turns of each of the coils 200-3 of the third phase winding are similarly wound by indexing the stator core in the direction reverse from the index direction for the first-wound portions of the coils 200-3, as indicated by the arrow C2 in FIG. 12, and the wire is connected to the terminal V.

At this stage, all of the coils 200 of each phase winding are fully wound. Therefore, the wire may be severed from the source, and the wound stator may be removed from the apparatus and replaced with a fresh, unwound stator core 22.

The above-described winding method may alternatively, and perhaps more simply, be characterized as winding two sets of coils for each phase winding. For example, winding two coils per phase winding in each pair of core slots, each coil having N turns of wire, rather than winding one split coil per phase winding having 2N turns of wire, where 2N is total number of desired turns of wire wound in each pair of core slots (Alternatively, the two coils may be characterized as having M and N turns, respectively, rather than a split coil having M+N turns). Thus, the stator core is indexed between the winding of each coil of a given phase winding in a first direction when winding the first set of coils for the given phase winding. The stator core is indexed between the winding of each coil of the given phase in a reverse or opposite direction when winding the second set of coils for the given phase winding.

With reference now to FIG. 1, the above-described winding method may be carried out by use of a single flier stator winding apparatus, generally designated 30. The winding apparatus 30 includes a rotator mechanism, shown partially schematically at 32. The rotator mechanism 32 includes a drive mechanism 32A that drives a rotator spindle 34. The rotator mechanism 32 may be similar to a conventional rotator mechanism used in flier-type armature winding machines. Examples of such rotator mechanisms used in armature winding machines are found in the aforementioned U.S. Pat. No. 4,915,313 to Banner et al. and U.S. Pat. No. 5,187,856 to Corey et al.

An arbor assembly, generally designated 36, is drivingly connected to the rotator spindle 34. As is conventional, a fixed inner shield 38 and an axially movable outer shield 39 are mounted coaxial with the rotatable arbor assembly 36 to selectively cover or expose a selected one of the terminals 28.

With further reference to FIG. 1, a conventional, rotatable flier mechanism, generally designated 40 is located adjacent the free, forward end of the arbor assembly 36 and draws wire from a source of wire under tension (not shown) to wind coils of wire into selected pairs of slots 23 in the stator core 22, as described above. In addition, a combined winding form and lead guide mechanism assembly, generally designated 42, is attached in a conventional manner to the flier mechanism 40. Although the assembly 42 may be conventional, an improved winding form assembly with this invention is presently preferred, the details of which are discussed below. A center wire guide assembly, generally designated 44, is also located adjacent the free, forward end of the arbor assembly 36 and comprises a generally C-shaped center wire guide 46 mounted on an L-shaped stanchion, generally designated 48. As is well known, a lead guide operator, shown partially schematically at 50, is provided to activate the lead guide mechanism of the assembly 42, as will be described below.

The arbor assembly 36 is drivingly connected to the rotator spindle 34 by a disk-like, C-shaped connector 52 that is assembled in a manner well known in the art into slots 54 in the arbor assembly 36 and corresponding slots 54A in the rotator spindle 34. The inner shield 38 is connected to the front plate 55 of the rotator mechanism 32 in a quick-disconnect manner, as described in the aforementioned U.S. Pat. No. 4,915,313. Likewise, the retractable outer shield 39 is similarly connected to an actuator (not shown) in a quick-disconnect fashion also in accordance with the teaching of the '313 patent.

With reference to FIGS. 1 and 2, the arbor assembly 36 comprises a tubular stator mounting shaft 56. An expandable mandrel, generally designated 58, is provided at the free, forward end of the shaft 56. As best seen in FIG. 2, a sleeve 59 is slidably received coaxially over the nose of the shaft 56 and abuts against a shoulder 56A. The sleeve 59 is secured to the shaft 56 by a pin 59A and has recesses 60 which receive the terminals 28 of a stator core 22 mounted on the shaft 56 in preparation of winding coils of wire onto the stator core 22. The precise size, shape and location of the terminal recesses 60 are determined by the particular terminal configuration of the part to be manufactured, which varies from part to part.

Referring now to FIG. 2, the mandrel 58 comprises a fixed key 62 and a pair of pivotal keys 64 that are biased radially inward by a resilient, rubber O-ring 66. Of course, it will be understood that, although a pair of pivotal keys 64 is preferred, a single pivotal key 64 may be sufficient in certain circumstances. Preferably, the fixed key 62 is attached to the free, forward end of the shaft 56 by a pair of screws 68 so that the forward end of the key 62 extends flush with the nose of the shaft 56. Although substantially equidistant circumferential spacing of the fixed key 62 and the pivotal keys 64 is presently preferred, as illustrated in FIGS. 3 and 4, the key 62 may be located at any desired angular position relative to the pivotal keys 64 so long as the key 62 corresponds with a slot in the bore 24 of the stator core 22, as will be described below.

With further reference to FIG. 2, the pivotal keys 64 are each located in an axially-extending slot 70 formed near the forward end of the shaft 56 and circumferentially-spaced around the outside thereof. The keys 64 are each pivotally mounted in their respective slots 70 by a pivot pin 72, which extends through and frictionally engages a bore 74 in the shaft 56 extending perpendicular to its associated slot 70. Each pivot pin 72 also extends through an aperture 76 near the rear end of its associated key 64 when the key 64 is located in its slot 70. As is evident, the keys 64 are thus radially pivotal relative to the shaft 56, and may be employed to grip a stator 20, as will be described in further detail below.

The resilient, rubber O-ring 66 extends around the shaft 56 near the nose thereof and around the outside of the forward end of each of the pivotal keys 64 to thereby bias the keys 64 radially inward. Each key 64 has a notch in the forward end thereof adapted to receive the O-ring 66. As a result of the biasing force provided by the O-ring 66, the keys 64 are each urged inward to a retracted position, as shown in FIG. 3, but may be pivoted radially outward for purposes which will be described below in further detail.

In operation of the expandable mandrel 58, an unwound stator core 22 is mounted on the shaft 56 with its axis parallel to the longitudinal axis of the shaft 56. As best shown in FIG. 2, the surface forming the bore 24 of the stator core 22 has three slots or keyways 82 located at spaced locations around the inside of the stator bore 24. In the illustrated embodiment, the keyways 82 are formed by and integral with laminations forming the stator core 22, although the keyways 82 could be formed in any other suitable manner, such as by a dummy insert. For reasons which will become apparent, these keyways 82 are formed at spaced-apart locations around the circumference of the stator bore 24 and sized so as to correspond to the keys 62 and 64 which form the mandrel 58. It will be understood, though, that although the illustrated keyways 82 are substantially equally spaced, other spacing arrangements may be appropriate.

With reference to FIG. 3, a stator core 22 is located adjacent and axially aligned with the forward end of the shaft 56 with the slot 82A aligned with the fixed key 62. Here, it will be noted that the stator core 22 may be so located manually and the following steps may also be performed manually. However, it is contemplated that the mounting of unwound stator cores 22 onto the shaft 56 may be performed automatically using a palletized system for conveying stator core 22 to and from the apparatus 30. In such case, a stator core 22 may be located adjacent and axially aligned with the arbor assembly 36 by any suitable mechanism, such as an elevator mechanism or a conventional pick-and-place mechanism. In any case, it will be recognized that it would be beneficial to provide some mechanism on the support pallets for maintaining the stator cores 22 in a predetermined orientation as they are conveyed to and from the apparatus 30, so that the keyways 82 may be properly aligned with the keys 62 and 64.

After the stator core 22 is located adjacent the forward end of the shaft 56, the stator 20 is moved toward the shaft 56 so that the nose of the shaft 56 is received in the bore of the stator core 22 and the fixed key 62 is received in the keyway 82A. As is evident, the fixed key 62 is provided for alignment and orientation purposes. Thus, when a stator 20 is so mounted onto the shaft 56, the stator 20 is properly oriented relative to the shaft 56 so that the terminals 28 of the stator 20 are received in the appropriate recesses 60 and the keyways 82B are properly aligned with the pivotal keys 64.

Because the fixed key 62 provides a known orientation of the core 22 relative to the shaft 56, a proximity sensor (not shown) located adjacent the shaft 56 may be used to determine when the shaft 56, and thereby the core 22, are at a home position wherein the orientation of the core 22 relative to the winding form assembly 42 is known. Thereafter, the core 22 may be rotated to any desired angular orientation, such as to properly orient selected core slots 23 for winding coils of wire therein or to loop a strand of wire around a terminal 28. In this respect, a screw (not shown) is threaded into a radial bore in the shaft 56. The magnetic proximity sensor is located adjacent the shaft 56 and detects when the screw is aligned therewith.

With reference to FIGS. 3 and 4, the pivotal keys 64 remain, until this point, biased radially inward by the O-ring 66 and do not engage surfaces defining the stator bore 24. To lock the stator core 22 to the shaft 56, a mandrel actuator or push rod 84, which extends within the tubular shaft 56, is extended into contact with the inwardly facing surfaces of the pivotal keys 64, as shown in FIG. 4, by use of a suitable actuator (not shown). The actuator for extending the rod 84 may be any suitable actuator, but the rod 84 is preferably extended and retracted in a manner similar to the extension and retraction of the collet actuator push rod described in the aforementioned U.S. Pat. No. 4,915,313 and U.S. Pat. No. 5,187,856.

Because the forward end 84A of the rod 84 is bullet-shaped, as shown in FIG. 2, each of the keys 64 is pivotally cammed radially outward by the actuator rod 84. As a result of the pivotal movement of the keys 64, each of the keys 64 is received in a slot or keyway 82B to thereby lock the stator 20 to the arbor assembly 36. In addition, the engagement between the keys 62 and 64 with the keyways 82 serves to drivingly interconnect the shaft 56 and the stator core 22 so that the stator core 22 will rotate with the shaft 56 as it is driven by the rotator mechanism 32. Of course, one skilled in the art will recognize that a similar result will be obtained where the pivotal keys 64 do next extend into keyways, but simply frictionally engage the inner surface of the stator core 22.

With reference to FIG. 2, radially-projecting, wire-guiding pins 86 are provided adjacent both sides of each of the recesses 60 and are frictionally engaged in radial bores in the shaft 56. As such, the pins 86 are each located closely adjacent a terminal 28 when a stator core 22 is mounted on the shaft 56. It will be recognized that, if a single terminal 28 is received in a recess 60, a pin 86 will be located on either side of the single terminal 28. On the other hand, if more than one terminal 28 is received in a recess 60, a pin 86 will only be located adjacent the terminals 28 closest to the sides of the recess 60. The pins 86 engage the wire as the stator core 22 is indexed following the connection of the wire to a terminal 28 and function to cam and guide the wire hooked to a terminal over and around the terminal board 26.

After the winding of coils onto the stator core 22 is completed, the actuator rod 84 is retracted so that the O-ring 66 biases the pivotal keys 64 radially inward and out of the keyways 82B (or otherwise out of engagement with the inner surface of the stator). Consequently, the mandrel 58 no longer grips the wound stator 20, and the freshly wound stator 20 may be removed from the arbor assembly 36 and replaced with an unwound stator core 22.

Figure 5:
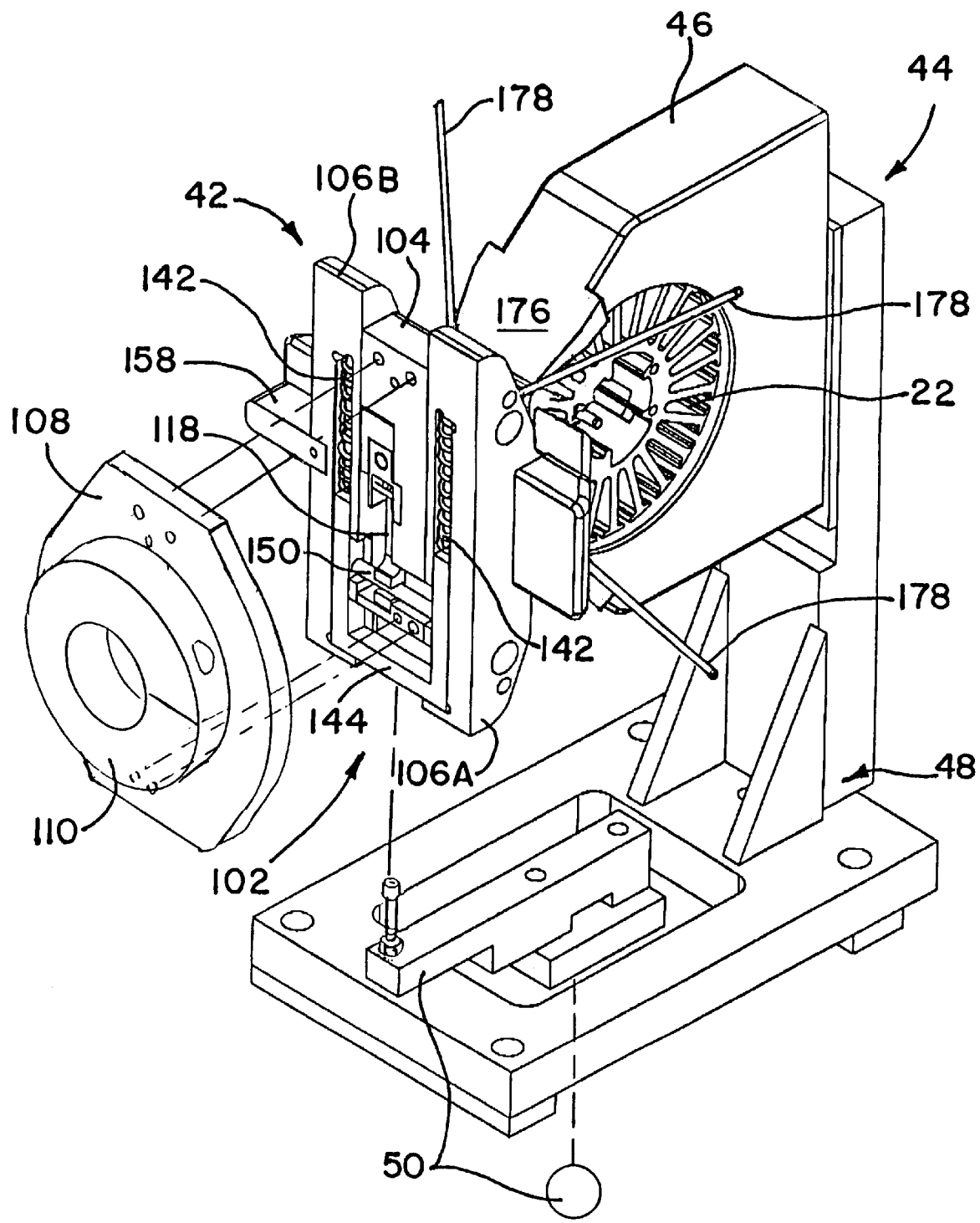
FIG. 5 is a partly-exploded, perspective view of another portion of the apparatus of FIG. 1 showing a combined winding form and lead guide assembly and a center wire guide.
Figure 6:
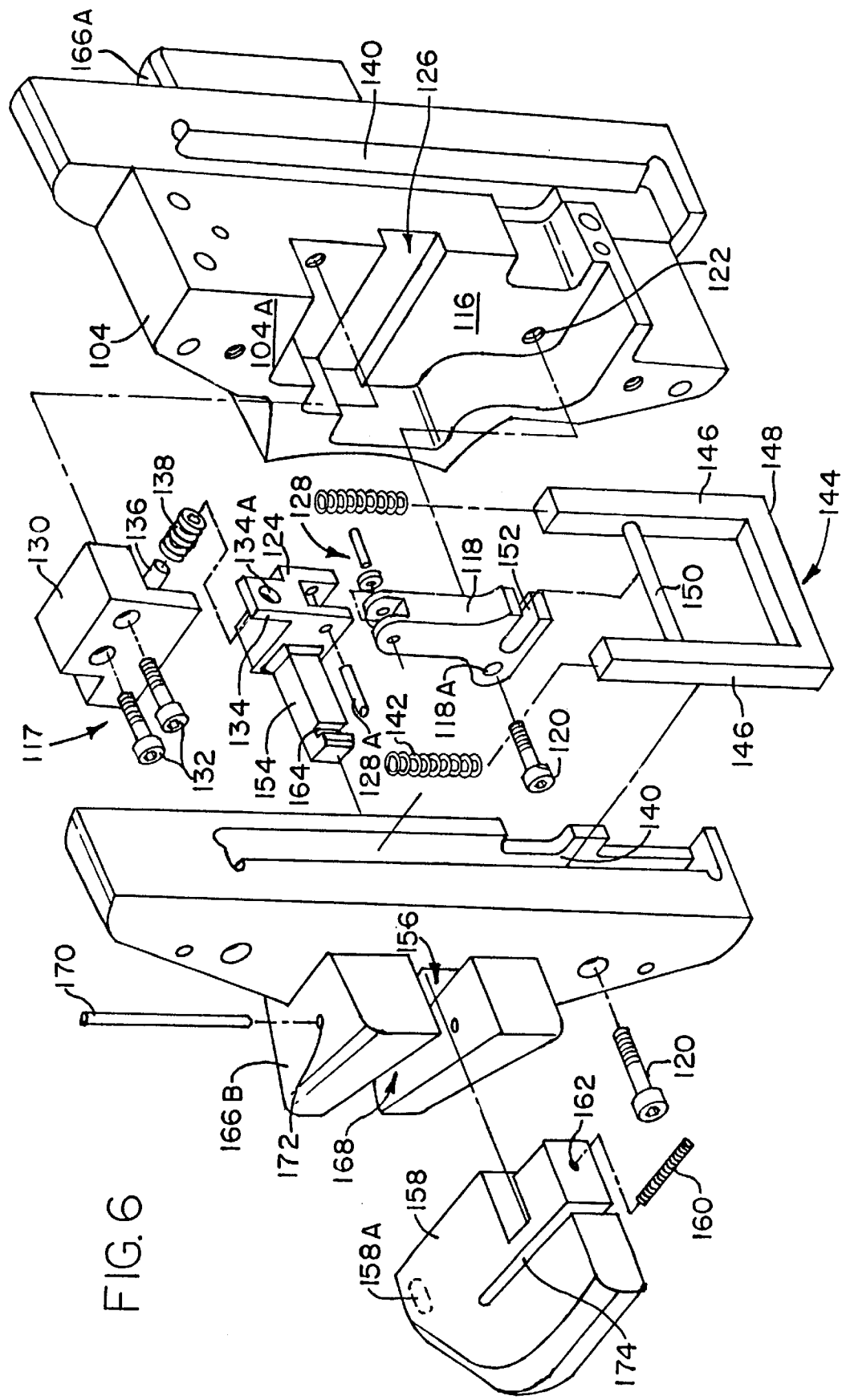
FIG. 6 is an exploded, perspective view of the winding form and lead guide assembly of FIG. 5, but shown on a larger scale than FIG. 5.

With reference to FIGS. 5 and 6, an improved winding form assembly 42 including an integral lead wire guiding or a so-called lead guide mechanism 102 is shown. Generally, the winding form assembly 42 differs from conventional winding form assemblies in that the lead guide sliding assembly of the lead guide mechanism 102 is located internally of the assembly 42.

The winding form assembly 42 includes a center chuck body 104 fixed between a pair of side plates 106, namely a front side plate 106A and a rear side plate 106B. Both the chuck body 104 and the side plates 106 have highly polished surfaces over which insulated magnet wire is coursed into slots 23 in the stator core 22 to form stator coils (FIG. 13). As will be described below in further detail, a center wire guide 46 (FIG. 5) is also provided to assist in guiding the magnet wire into the slots 23.

Figure 8:
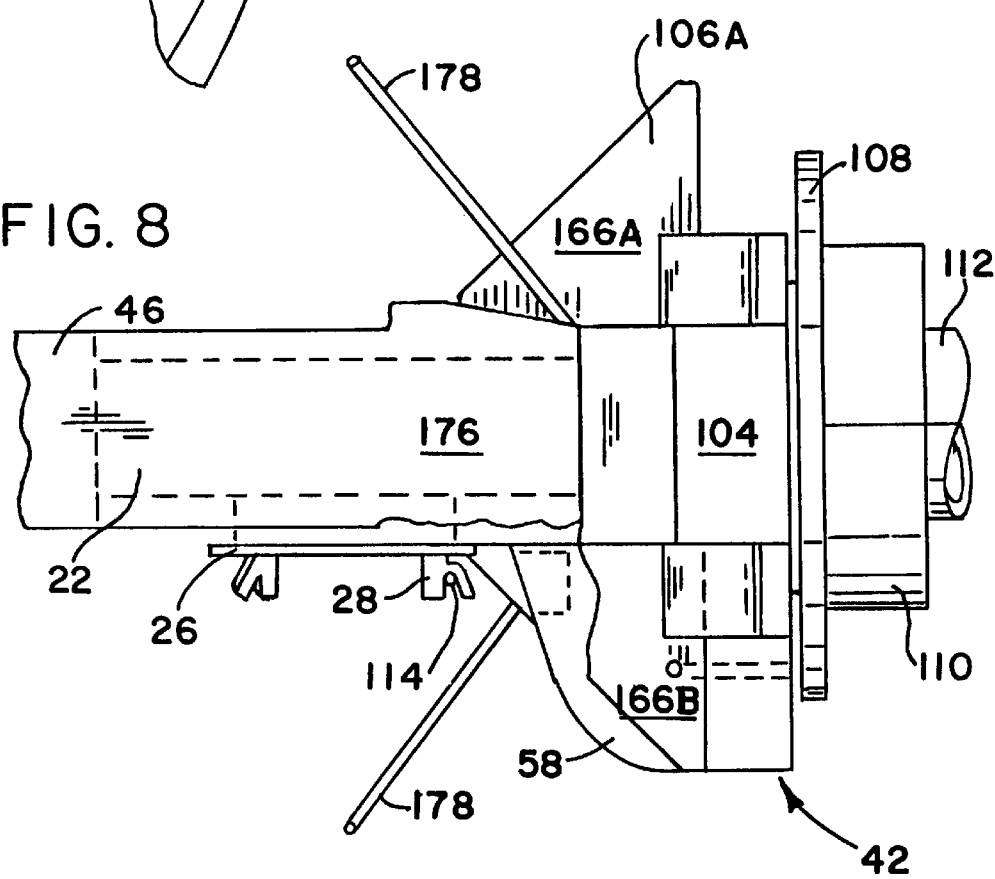
FIG. 8 is a fragmentary, top plan view of the portion of the apparatus shown in FIG. 5.

With reference to FIG. 5, the winding form assembly 42 is mounted upon a mounting or backing plate 108 provided with a bearing housing or clamp 110. The clamp 110 is affixed to the outer race of a bearing (not shown) on the end of a flier spindle 112 (FIG. 8). Consequently, the winding form assembly 42 is located adjacent the forward end of the shaft 56, as shown in FIG. 1.

Figure 7:
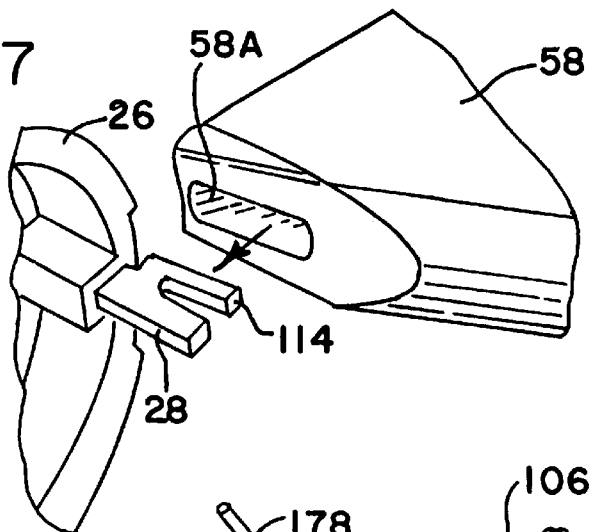
FIG. 7 is an enlarged, fragmentary perspective view of a portion of a lead guide assembly located adjacent a terminal projecting from a stator core.
Figure 9:
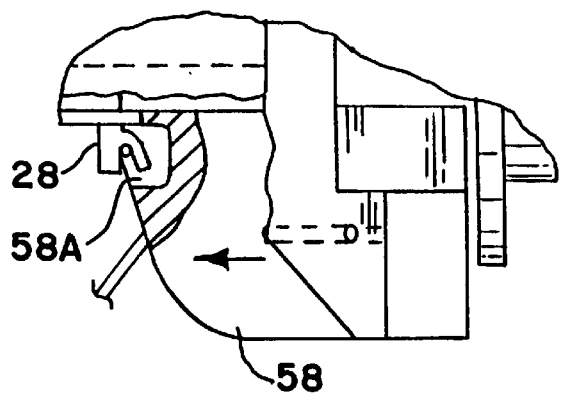
FIG. 9 is an enlarged, top plan view similar to FIG. 8, but showing the apparatus at a later stage in the manufacturing process.

With particular reference again to FIG. 6, the winding form assembly 42 includes an integral lead guide actuator mechanism, generally designated 102. As will be evident to one skilled in the art, the lead guide mechanism 102 is provided to ensure that coil lead wires are properly hooked or looped about tangs 114 on stator terminals 28, as partially illustrated in FIGS. 7 through 9. In this respect, it will be understood that the winding form assembly 42 and this aspect of the instant invention are equally applicable to both the manufacture of electric motor stators and armatures. Thus, the lead guide mechanism 102 could also be used to ensure that lead wires are properly looped or hooked about tangs projecting from a commutator of a conventional electric motor armature.

Traditionally, the lead guide sliding assembly of lead guide mechanisms have been located externally of the side plates forming a winding form assembly. So that the side plates 106 may be readily removed and replaced with other side plates 106 providing different wire-guiding characteristics, the instant invention provides a winding form assembly 42 wherein the lead guide sliding assembly 117 of the lead guide mechanism 102 are located in a cavity 116 formed in the center chuck body 104.

With continued reference to FIGS. 5 and 6, the center chuck body 104 includes a cavity 116 that opens to the rear face 104A of the chuck body 104. The lead guide sliding assembly, generally designated 117, is located in the recess 116. The assembly 117 includes a pivotal finger 118 secured in the cavity 116 by use of a screw 120. The screw 120 passes through an aperture 118A in the finger 118, thereby forming a pivot pin, and is received in a tapped bore 122 in the surface of the cavity 116. A slide 124 is disposed in a longitudinal slot 126 in the surface of the cavity 116 and is further pivotally carried on the upper end of the finger 118 by roller assembly, generally designated 128. As is evident, pivotal movement of the lead guide finger 118 is then translated into linear movement of the slide 124 in the slot 126. A retainer pin 128A prevents the slide 124 from moving laterally from the finger 118.

A slide retainer 130 is secured to the rearwardly-facing surface of the cavity 116 above the slot 126 by means of a pair of screws 132 to retain the slide 124 in the slot 126, thereby confining the slide 124 to lateral movement. The slide 124 includes an upstanding plate 134 having a guide aperture 134A formed therein which receives a complimentary rod 136 on the slide retainer 130 to further guide the movement of the slide 124. A spring 138 is disposed about the rod 136 between the retainer 130 and the plate 134 to bias the slide 124 toward the open end of the slot 126, i.e. to the right in FIG. 6.

With continued reference to FIG. 6, the side plates 106 each have an elongated slot 140 that receives a spring 142 in the upper portion thereof, which spring 142 is shown compressed in FIG. 6. A U-shaped lead guide actuator, generally designated 144, has its arms 146 slidably disposed in the lower portions of respectively opposite ones of the slots 140 with the upper ends of the arms 146 in contact with the respective springs 142. Accordingly, the springs 142 bias the lead guide actuator 144 downward. For reasons which will become apparent, a cross bar 148 extends between the lower ends of the arms 146, and a separate drive bar 150 extends between the arms 146 intermediate the ends thereof. The drive bar 150 is aligned with and extends through the notch 152 in the finger 118. Thus, the lead guide actuator 144 may be driven upwardly by a lead guide operator, generally designated 50 (FIG. 5), to thereby pivot the finger 118, which results in lateral movement of the carrier slide 124. The drive mechanism may be similar to conventional drive mechanisms used for known winding forms and lead guide mechanisms for flier-type armature winding machines.

The slide 124 includes a longitudinally-extending arm 154 that extends through a laterally-extending opening 156 in the rear side plate 106B, as shown in FIG. 6. A lead guide member 158 is detachably mounted to the arm 154 by use of a ball-plunger assembly 160 that is threaded into a tapped bore 162 in the lead guide member 158 and engages a notch 164 in the arm 154. The lead guide member 158 has a tang-covering pocket 158A formed therein and is readily removed for replacement or repair or for purposes of switching side plates, as described above.

With further reference to FIG. 6 (and also FIG. 8), the side plates 106A and 106B each include longitudinally-extending wire guide portions 166A and 166B, respectively. The wire guide portions 166B of the rear side plate 106B have lateral slot 168 formed therein in which the lead guide member 158 is disposed. Accordingly, the slot 168 serves as a guide for the lead guide member 158. In addition, a removable guide pin 170 extends downwardly through an aperture 172 in the guide surfaces 166 of the rear plate 106B. Such pin 170 projects downwardly through a laterally-extending notch 174 formed in the lead guide member to further assist in guiding lateral movement of the lead guide member 158.

FIGS. 1 and 5 illustrate a preferred center wire guide assembly 44. A C-shaped center wire guide 46 is mounted on a stanchion 48, as shown in FIG. 5, with its free ends closely adjacent the winding form assembly 42. To prevent kinking or scraping of the magnet wire as the coils are wound into the core slots 23, each end of the center wire guide 46 may have a generally V-shaped, wire-guiding nose 176 formed thereon, as best shown in FIG. 5.

Alternatively, a wire-guiding horn 178 may be extended from each side of each end of the center wire guide 46. The upper horns 178 extend upwardly from the upper end of the center wire guide 46 and away from the winding form assembly 42. Similarly, the lower horns 178 extend downwardly from the lower end of the center wire guide 46 and away from the winding form assembly 42. Although the illustrated horns 178 have substantial length, one skilled in the art will recognize that only the portion of each horn 178 close to the end of the center wire guide 46 will actually be engaged by the wire as coils are wound. Therefore, the horns 178 may be substantially shorter than illustrated.

Although both the V-shaped nose 176 at each end of the center wire guide 46 and the horns 178 are illustrated in the drawings, it will be recognized that the nose 176 is inoperative where the horns 178 are employed. One skilled in the art will recognize that the V-shaped nose 176 may be sufficient for certain situations while other situations might instead require use of the horns 178.

Although the presently preferred embodiments of this invention have been described, it will be understood that within the purview of the invention various changes may be made within the scope of the following claims.

Having thus described my invention, I claim:

1. A method for manufacturing an electric motor stator, said stator comprising a core having a plurality of radially-opening core slots and a terminal board mounted to said core having plural positive terminals and at least one common or ground terminal, and a plurality of coils of magnet wire wound into pairs of said core slots, said coils comprising three phase windings, said method comprising:

winding a set of coils forming a first phase winding from a strand of wire connected to a first positive terminal;

connecting said strand of wire forming the coils of said first phase winding to a common or ground terminal;

winding a set of coils forming a second phase winding from a strand of wire connected to a common or ground terminal;

connecting said strand of wire forming the coils of said second phase winding to a second positive terminal;

winding a set of coils forming a third phase winding from a strand of wire connected to a third positive terminal; and connecting said strand of wire forming the coils of said third phase winding to a common or ground terminal.

2. The method of claim 1 wherein said stator core is indexed in a first direction between the winding of individual ones of the coils of the first and third phase windings and wherein said stator core is indexed in a second direction opposite said first direction between the winding of individual ones of the coils forming the second phase winding.

3. The method of claim 1 wherein each of said winding steps are performed by a winding machine having a rotatable flier, and wherein connections to said terminals are made by appropriate motions of said rotatable flier.

4. The method of claim 1 wherein said strand of wire forming the coils of said first phase winding and said strand of wire forming the coils of said second phase winding are connected to the same common or ground terminal.

5. The method of claim 4 wherein said terminal board has plural common or ground terminals and wherein said strand of wire forming the coils of said third phase winding is connected to a common or ground terminal separate from the common or ground terminal to which said strand of wire forming the coils of said first phase winding and said strand of wire forming the coils of said second phase winding are connected.

6. The method of claim 1 wherein said strand of wire forming the coils of said first phase winding and said strand of wire forming the coils of said second phase winding is the same strand of wire.

7. The method of claim 1 wherein each of said phase windings comprises first and second sets of coils, wherein each of the winding steps recited in claim 1 comprise winding a first set of coils forming the respective phase winding, and further comprising the steps of:

winding a second set of coils forming said first phase winding from a strand of wire connected to a common or ground terminal;

connecting said strand of wire forming said second set of coils of said first phase winding to said first positive terminal;

winding a second set of coils forming said second phase winding from a strand of wire connected to said second positive terminal;

connecting said strand of wire forming said second set of coils of said second phase winding to a common or ground terminal;

winding a second set of coils forming said third phase winding from a strand of wire connected to common or ground terminal; and connecting said strand of wire forming said second set of coils of said third phase winding to said third positive terminal.

8. A method for manufacturing an electric motor stator, said stator comprising a core having a plurality of radially-opening core slots and a terminal board mounted to said core having plural positive terminals and at least one common or ground terminal, and a plurality of coils of magnet wire wound into pairs of said core slots, said coils comprising three phase windings, said method comprising:

connecting a first strand of wire drawn from a source of wire to a first positive terminal;

winding a set of coils forming a first phase winding from said first strand of wire;

connecting said first strand of wire to a common or ground terminal;

winding a set of coils forming a second phase winding from said first strand of wire;

connecting said first strand of wire a second positive terminal;

severing said first strand of wire from said source of wire;

connecting a second strand of wire drawn from said source of wire to a third positive terminal;

winding a set of coils forming a third phase winding from said second strand of wire; and connecting said second strand of wire to a common or ground terminal.

9. The method of claim 8 wherein each of said winding steps are performed by a winding machine having a rotatable flier, and wherein each of said connecting steps is performed by appropriate motions of said rotatable flier.

10. The method of claim 8 wherein said terminal board has plural common or ground terminals and wherein said first strand of wire and said second strand of wire are each connected to a different common or ground terminal.

11. The method of claim 8 wherein said stator core is indexed in a first direction between the winding of individual ones of the coils forming the first and third phase windings and wherein said stator core is indexed in a second direction opposite said first direction between the winding of individual ones of the coils forming the second phase winding.

12. The method of claim 8 wherein each of said phase windings comprises first and second sets of coils, wherein each of the winding steps recited in claim 8 comprise winding a first set of coils of the respective phase winding, and further comprising the steps of:

winding a second set of coils forming said first phase winding from said second strand of wire;

connecting said second strand of wire to said first positive terminal;

severing said second strand of wire from said source of wire;

connecting a third strand of wire drawn from said source of wire to said second positive terminal;

winding a second set of coils forming said second phase winding;

connecting said third strand of wire to a common or ground terminal;

winding a second set of coils forming said third phase winding; and connecting said third strand of wire to said third positive terminal.

13. The method of claim 12 wherein said terminal board has at least three common or ground terminals and wherein said first strand of wire, said second strand of wire, and said third strand of wire are each connected to a different common or ground terminal.

14. The method of claim 12 wherein said stator core is indexed in a first direction between the winding of individual ones of the first set of coil forming said first phase winding, wherein said stator core is indexed in a second direction opposite said first direction between the winding of individual ones of the first set of coils forming said second phase winding, wherein said stator core is indexed in said second direction between the winding of individual ones of the second set of coils forming said first and third phase windings, and wherein said stator core is indexed in said first direction between the winding of individual ones of the second set of coils forming the second phase winding.

15. A method for manufacturing an electric motor stator, said stator comprising a core having a plurality of radially-opening core slots and a plurality of coils comprising a plurality of phase windings wound into pairs of said core slots, each of said coils being formed from M+N turns of magnet wire where M and N are integers, said method comprising:

winding M wire turns forming each of the coils of the first phase winding by steps including rotating a stator core about its longitudinal axis in a first phase, first-pass direction between the winding of the wire turns forming individual ones of said coils of said first phase winding;

winding M wire turns forming each of the coils of each of the remaining phase windings, in succession, by steps including, for each phase winding, rotating said stator core about said axis in a first-pass direction predetermined for each of the remaining phase windings between the winding of the wire turns forming individual ones of said coils of each of said remaining phase windings, said predetermined first-pass direction being a second direction opposite said first phase, first-pass direction for the second phase winding and alternating from one of said remaining phase windings to the next; and winding the remaining N wire turns forming each of the coils of each of the phase windings, in succession, by steps including, for each phase winding, rotating said stator core about said axis in a second-pass direction predetermined for each of said phase windings between the winding of the remaining wire turns forming individual ones of said of coils of each of said phase windings, said predetermined second-pass direction being opposite said first-pass direction for each of said phase windings.

16. The method of claim 15 wherein said wire turns are wound using a rotatable flier mechanism.

17. The method of claim 16 wherein the wire turns forming successive ones of the coils of each phase winding are wound using alternating directions of rotation of said flier mechanism from one coil to the next.

18. The method of claim 15 where M and N are equal.

* * * * *